US 12,104,978 B2

United States Patent
Guidry et al.

(10) Patent No.: US 12,104,978 B2
(45) Date of Patent: Oct. 1, 2024

(54) UTILIZING A GEAR BOX BREAK-IN ASSEMBLY

(71) Applicant: Textron Systems Corporation, Hunt Valley, MD (US)

(72) Inventors: Derek Evan Guidry, Madisonville, LA (US); Kyle Elgen McDermot, New Orleans, LA (US)

(73) Assignee: Textron Systems Corporation, Hunt Valley, MD (US)

( * ) Notice: Subject to any disclaimer, the term of this patent is extended or adjusted under 35 U.S.C. 154(b) by 210 days.

(21) Appl. No.: 17/852,539

(22) Filed: Jun. 29, 2022

(65) Prior Publication Data

US 2023/0003616 A1    Jan. 5, 2023

Related U.S. Application Data (60) Provisional application No. 63/216,709, filed on Jun. 30, 2021.

(51) Int. Cl.
| | | |
|---|---|---|
| *G01M 13/025* | (2019.01) | |
| *B63H 23/06* | (2006.01) | |
| *G01M 13/021* | (2019.01) | |

(52) U.S. Cl.
CPC .......... *G01M 13/025* (2013.01); *B63H 23/06* (2013.01); *G01M 13/021* (2013.01)

(58) Field of Classification Search
CPC .............. G01M 13/025; G01M 13/021; B63H 23/06; B63H 23/02; B63B 71/00
See application file for complete search history.

(56) References Cited

U.S. PATENT DOCUMENTS

| | | | | |
|---|---|---|---|---|
| 3,680,373 A | * | 8/1972 | Kearfott | G01M 13/021 |
| | | | | 73/162 |
| 4,159,642 A | * | 7/1979 | Hudson | G01M 13/025 |
| | | | | 73/115.02 |

(Continued)

FOREIGN PATENT DOCUMENTS

| | | |
|---|---|---|
| CN | 108709738 | 10/2018 |
| CN | 108896302 | 11/2018 |

(Continued)

OTHER PUBLICATIONS

PCT/US2022/035443; Notification of Transmittal of the International Search Report and the Written Opinion of the International Searching Authority, or the Declaration; dated Nov. 14, 2022; 16 pages.

*Primary Examiner* — Freddie Kirkland, III
(74) *Attorney, Agent, or Firm* — BainwoodHuang (57) ABSTRACT

Techniques are directed to utilizing a break-in assembly to break-in a gear box. The break-in assembly includes a gear box support to support the gear box. The break-in assembly further includes a drive apparatus coupled with the gear box support, the drive apparatus being constructed and arranged to drive the gear box while the gear box is supported by the gear box support. The break-in assembly further includes a loading apparatus disposed in a fixed position relative to the gear box support, the loading apparatus being constructed and arranged to apply loading to the gear box while the drive apparatus drives the gear box. Accordingly, the gear box may be installed on the break-in assembly, broken in during a gear box break-in period while the gear box is installed on the break-in assembly, removed from the break-in assembly, and installed on a water vessel.

20 Claims, 7 Drawing Sheets

(56) References Cited

U.S. PATENT DOCUMENTS

| | | | | |
|---|---|---|---|---|
| 4,196,620 | A * | 4/1980 | Dapiran | G01M 13/021 73/162 |
| 5,113,704 | A * | 5/1992 | Yano | G01M 13/021 33/501.13 |
| 5,477,740 | A * | 12/1995 | Shioya | G01M 13/025 475/225 |
| 5,537,865 | A * | 7/1996 | Shultz | G01M 13/025 73/116.04 |
| 6,047,596 | A * | 4/2000 | Krug | G01M 13/025 73/178 H |
| 6,662,671 | B1 * | 12/2003 | Kopp | G01M 13/025 73/862.08 |
| 6,807,852 | B2 * | 10/2004 | Ranchin | G01M 13/026 73/116.01 |
| 7,204,161 | B2 * | 4/2007 | Juranitch | G01M 13/02 73/862.322 |
| 8,109,854 | B2 | 2/2012 | Michaud et al. | |
| 8,635,904 | B2 * | 1/2014 | Gutsche | G01M 13/026 73/116.04 |
| 8,844,344 | B2 * | 9/2014 | Plowman | G01M 13/021 73/162 |
| 9,879,717 | B1 | 1/2018 | Gonzalez | |
| 10,549,833 | B2 | 2/2020 | Davis et al. | |
| 11,428,605 | B2 * | 8/2022 | Wei | G01M 7/027 |
| 2005/0034540 | A1 * | 2/2005 | Juranitch | G01M 13/028 73/862.322 |
| 2011/0281679 | A1 | 11/2011 | Larrabee et al. | |
| 2012/0329593 | A1 | 12/2012 | Larrabee et al. | |
| 2019/0170186 | A1 | 6/2019 | Gonzalez et al. | |

FOREIGN PATENT DOCUMENTS

| | | |
|---|---|---|
| DE | 102006047268 A1 | 4/2008 |
| EA | 021045 | 3/2015 |
| GB | 2429779 | 3/2007 |

\* cited by examiner

UTILIZING A GEAR BOX BREAK-IN ASSEMBLY

CROSS REFERENCE TO RELATED APPLICATIONS

This application is a regular utility application based on earlier-filed U.S. Application No. 63/216,709 filed on Jun. 30, 2021, entitled "UTILIZING A GEAR BOX BREAK IN ASSEMBLY", the contents and teachings of which are hereby incorporated by reference in their entirety.

BACKGROUND

Conventional water vessels may utilize stern drives for propulsion. Examples of such water vessels include military watercraft, commercial ships/boats, recreational yachts, as well as other types of boats and water vehicles.

Prior to regular use, operators typically drive such water vessels at varying speeds during initial water vessel break-in periods. An example water vessel break-in period is 10 hours long. Such operation of the water vessels during the water vessel break-in periods may reduce or eliminate any unevenness and/or roughness/imperfection among various stern drive components so that such components then operate smoothly and wear evenly during regular use.

SUMMARY

Unfortunately, there are deficiencies to the above-described approach of driving water vessels at varying speeds during initial water vessel break-in periods. For example, such an approach consumes extensive resources such as water vessel service time, crew time, vessel preparation and docking resources, and so on. Moreover, if such a water vessel later requires a replacement stern drive, the water vessel must be removed from service while the replacement stern drive is broken in during another water vessel break-in period.

In contrast to the above-described approach of driving water vessels at varying speeds during water vessel break-in periods, improved techniques are directed to utilizing a break-in assembly to break-in a gear box (e.g., stern drive gearing/linkage) prior to deployment of the gear box in the field. Along these lines, such a gear box may eventually form part of a stern drive of a water vessel. However, rather than perform break-in of the gear box while the gear box is on the water vessel, the gear box may be installed on the break-in assembly where a drive apparatus drives the gear box and a loading apparatus simultaneously applies load to the gear box in order to operate (or exercise) the gear box in accordance with a predefined break-in schedule. Such a break-in assembly may include a water tank within which at least a portion of the gear box operates in order to receive regular water cooling from water within the water tank. Such processing via the break-in assembly enables the gear box to be broken in prior to installation on a water vessel thus minimizing consumption of other water vessel resources (e.g., water vessel service time, crew time, etc.).

One embodiment is directed to a method of operating a gear box. The method includes installing the gear box on a break-in assembly, breaking in the gear box during a gear box break-in period while the gear box is installed on the break-in assembly and, after the gear box break-in period, removing the gear box from the break-in assembly (e.g., for subsequent installation on a water vessel).

Another embodiment is directed to a break-in assembly to break-in a gear box. The break-in assembly includes a gear box support constructed and arranged to support the gear box. The break-in assembly further includes a drive apparatus coupled with the gear box support, the drive apparatus being constructed and arranged to drive the gear box while the gear box is supported by the gear box support. The break-in assembly further includes a loading apparatus disposed in a fixed position relative to the gear box support, the loading apparatus being constructed and arranged to apply loading to the gear box while the drive apparatus drives the gear box.

In some arrangements, the drive apparatus includes an electric motor constructed and arranged to operate the gear box, and a controller coupled with the electric motor. The controller is constructed and arranged to direct the electric motor to operate the gear box at varying speeds during a gear box break-in period.

In some arrangements, the controller includes memory, and control circuitry coupled with the memory. The memory stores a break-in schedule which causes the control circuitry to direct the electric motor to vary rotational speed of an input shaft of the gear box in accordance with a predefined engine curve during the gear box break-in period.

In some arrangements, the loading apparatus includes a set of dynamometers constructed and arranged to apply the loading to the gear box while the drive apparatus drives the gear box. Such a set of dynamometers may include one or more dynamometers and/or dynamometer related componentry (e.g., ancillary hardware to connect each dynamometer to the gear box and/or support dynamometer operation).

In some arrangements, the gear box includes a propeller shaft configured to spin a propeller. Additionally, the set of dynamometers includes a water brake dynamometer constructed and arranged to couple with the propeller shaft of the gear box to provide load to the propeller shaft.

In some arrangements, the gear box includes a first propeller shaft, a second propeller shaft, and linkage configured to simultaneously spin the first propeller shaft and the second propeller shaft in opposite directions. Additionally, the set of dynamometers includes:

(i) a first water brake dynamometer constructed and arranged to couple with the first propeller shaft of the gear box to provide a first load to the first propeller shaft when the linkage simultaneously spins the first propeller shaft and the second propeller shaft in the opposite directions, and (ii) a second water brake dynamometer constructed and arranged to couple with the second propeller shaft of the gear box to provide a second load to the second propeller shaft when the linkage simultaneously spins the first propeller shaft and the second propeller shaft in the opposite directions.

In some arrangements, the loading apparatus further includes a dynamometer base constructed and arranged to hold the first water brake dynamometer and the second water brake dynamometer in a side-by-side parallel arrangement while the first water brake dynamometer couples with the first propeller shaft and the second water brake dynamometer couples with the second propeller shaft. For example, each dynamometer may have an elongated axle and such axles are arranged to parallel to each other.

In some arrangements, the break-in assembly further includes a water tank adjacent the gear box support. The water tank is constructed and arranged to contain water that provides cooling to the gear box while the drive apparatus drives the gear box.

In some arrangements, the gear box support is constructed and arranged to position at least a portion of the gear box within the water tank to enable water contained within the water tank to provide cooling to the gear box while the drive apparatus drives the gear box.

In some arrangements, the loading apparatus is constructed and arranged to mechanically engage with the portion of the gear box positioned within the water tank. For example, when installing the gear box on the break-in apparatus, the portion of the gear box may be connected to the loading apparatus, and the water tank is then filled with water to submerge the portion of the gear box connected to the loading apparatus within the water.

In some arrangements, once the gear box is installed on the break-in assembly, the assembly simultaneously drives the gear box using the drive apparatus and applies the loading to the gear box from the loading apparatus. In particular, the gear box is operated at varying speeds during the gear box break-in period In some arrangements, operating the gear box at the varying speeds during the gear box break-in period includes directing an electric motor to vary rotational speed of the gear box in accordance with a predefined engine curve during the gear box break-in period. Such operation may be in accordance with a computerized break-in schedule.

In some arrangements, the method of operating the gear box further includes, after the gear box is removed from the break-in assembly, interconnecting the gear box between an engine and a set of propellers of a water craft, and providing drive from the engine to the set of propellers through the gear box to provide propulsion to the water craft.

Other embodiments are directed to apparatus, devices, assemblies, and so on. Some embodiments are directed to various methods, systems, and componentry which are involved in operating a gear box.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to utilizing a break-in assembly to break-in a gear box prior to deployment of the gear box in the field. For example, such a gear box may eventually form part of a stern drive of a water vessel. However, rather than breaking in the gear box while the gear box is on the water vessel, the gear box may be installed on the break-in assembly beforehand where a drive apparatus drives the gear box and a loading apparatus simultaneously applies load to the gear box in order to operate the gear box in accordance with a predefined break-in schedule. Such a break-in assembly may include a water tank within which at least a portion of the gear box operates in order to receive water cooling by design from water within the water tank. Such processing via the break-in assembly enables the gear box to be broken in prior to installation on a water vessel thus minimizing consumption of other water vessel resources.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
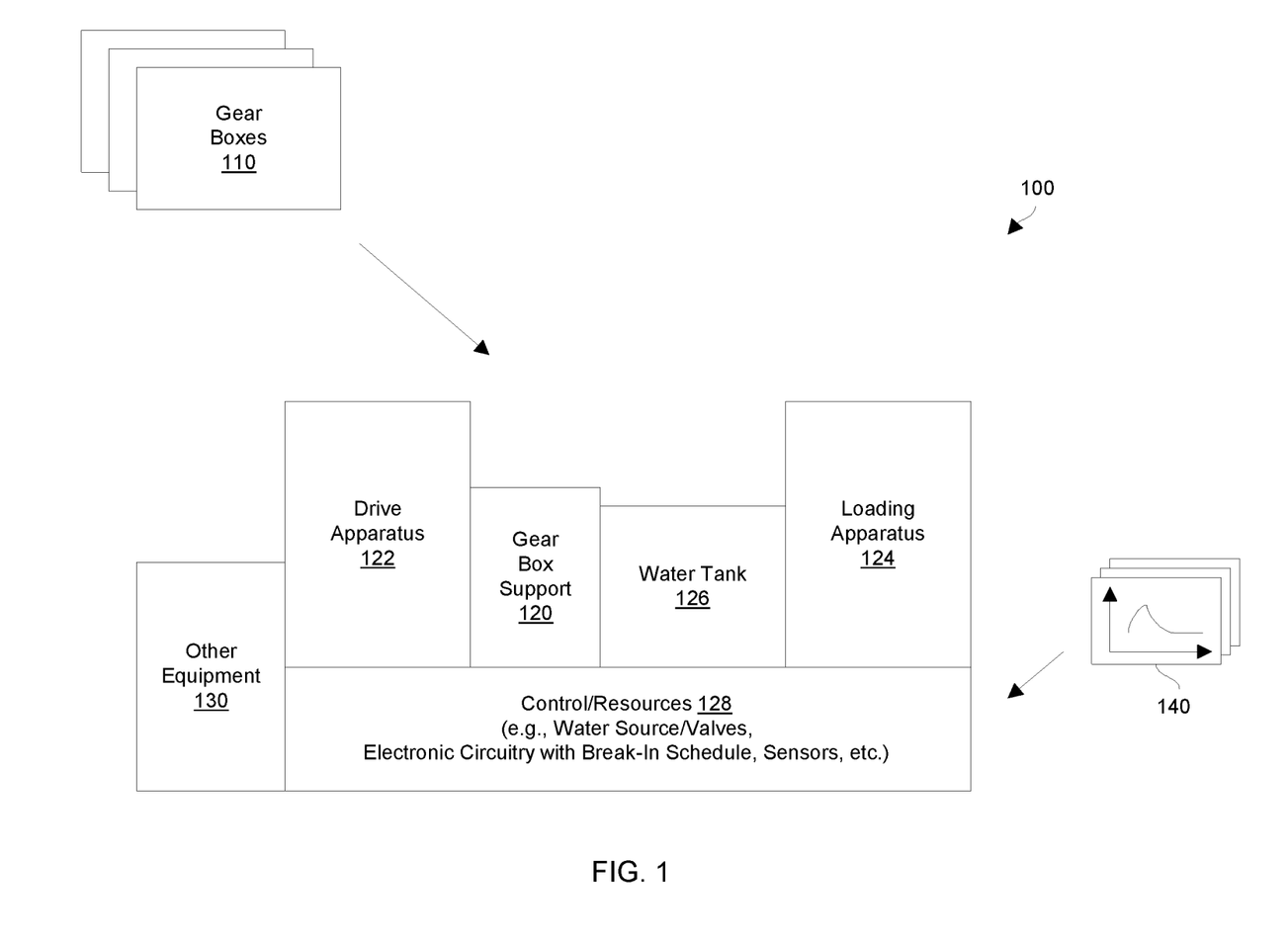
FIG. 1 is a block diagram of a break-in assembly in accordance with certain embodiments.
Figure 2:
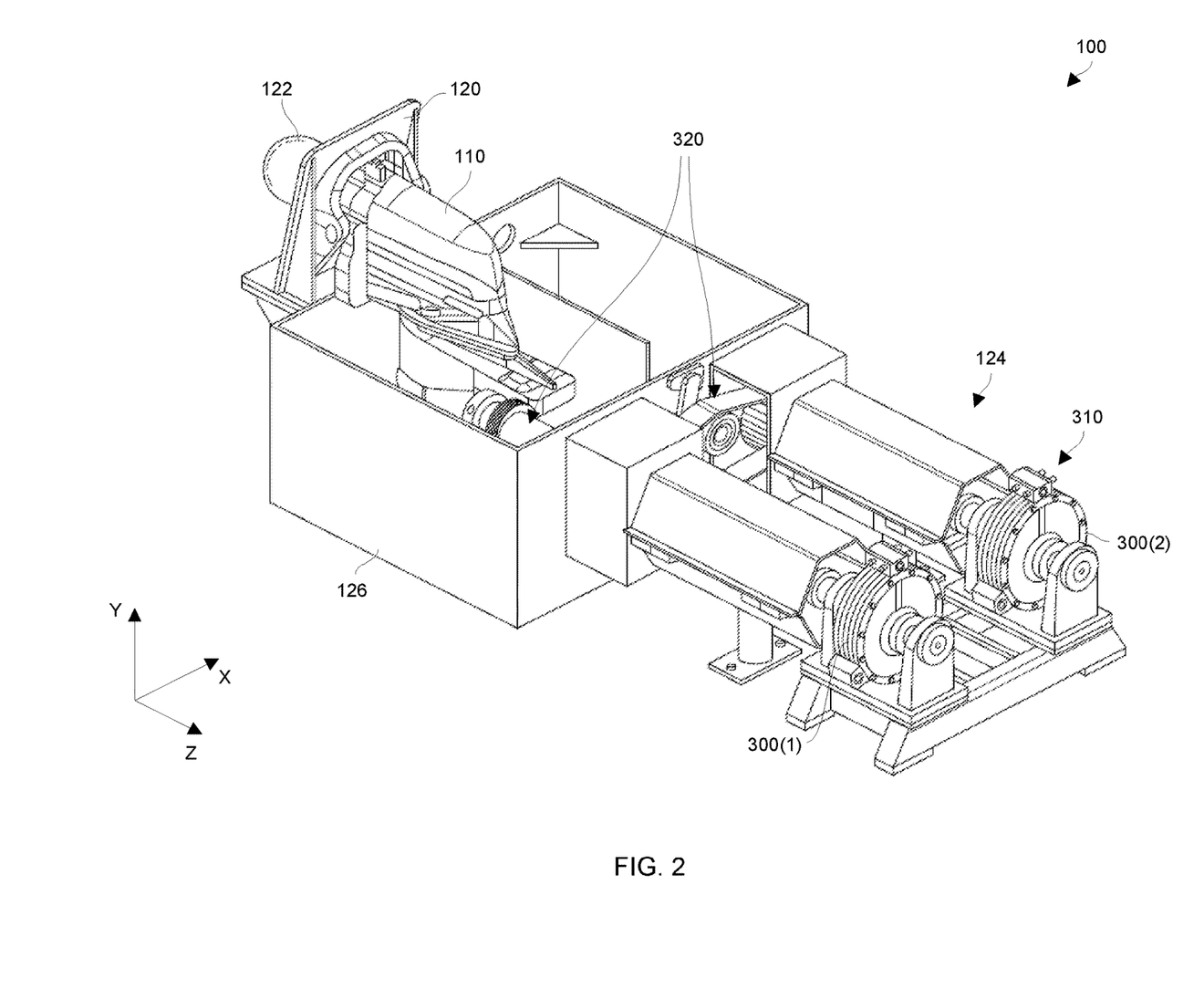
FIG. 2 is a first perspective view of the break-in assembly in accordance with certain embodiments.
Figure 3:
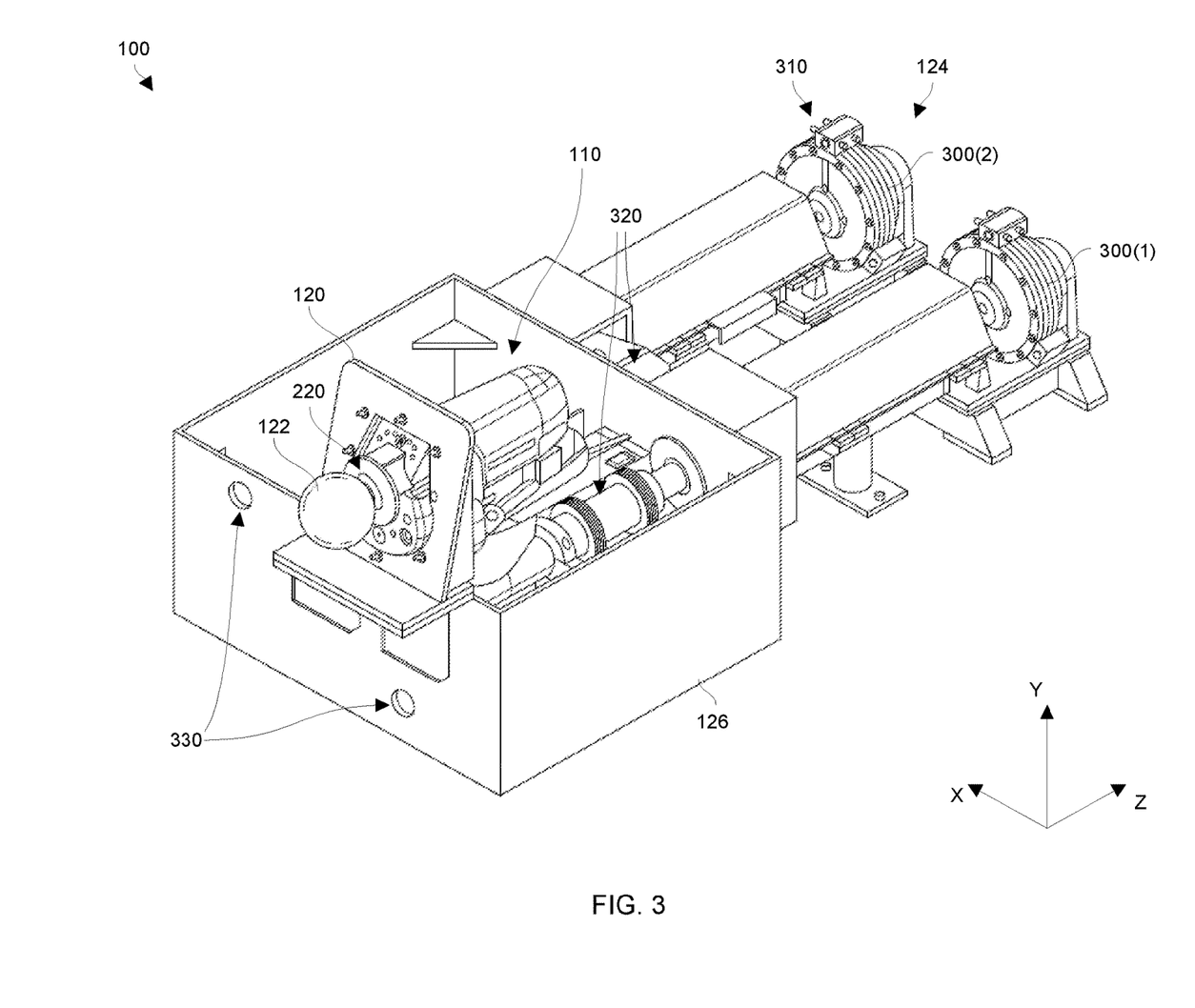
FIG. 3 is a second perspective view of the break-in assembly in accordance with certain embodiments.
Figure 4:
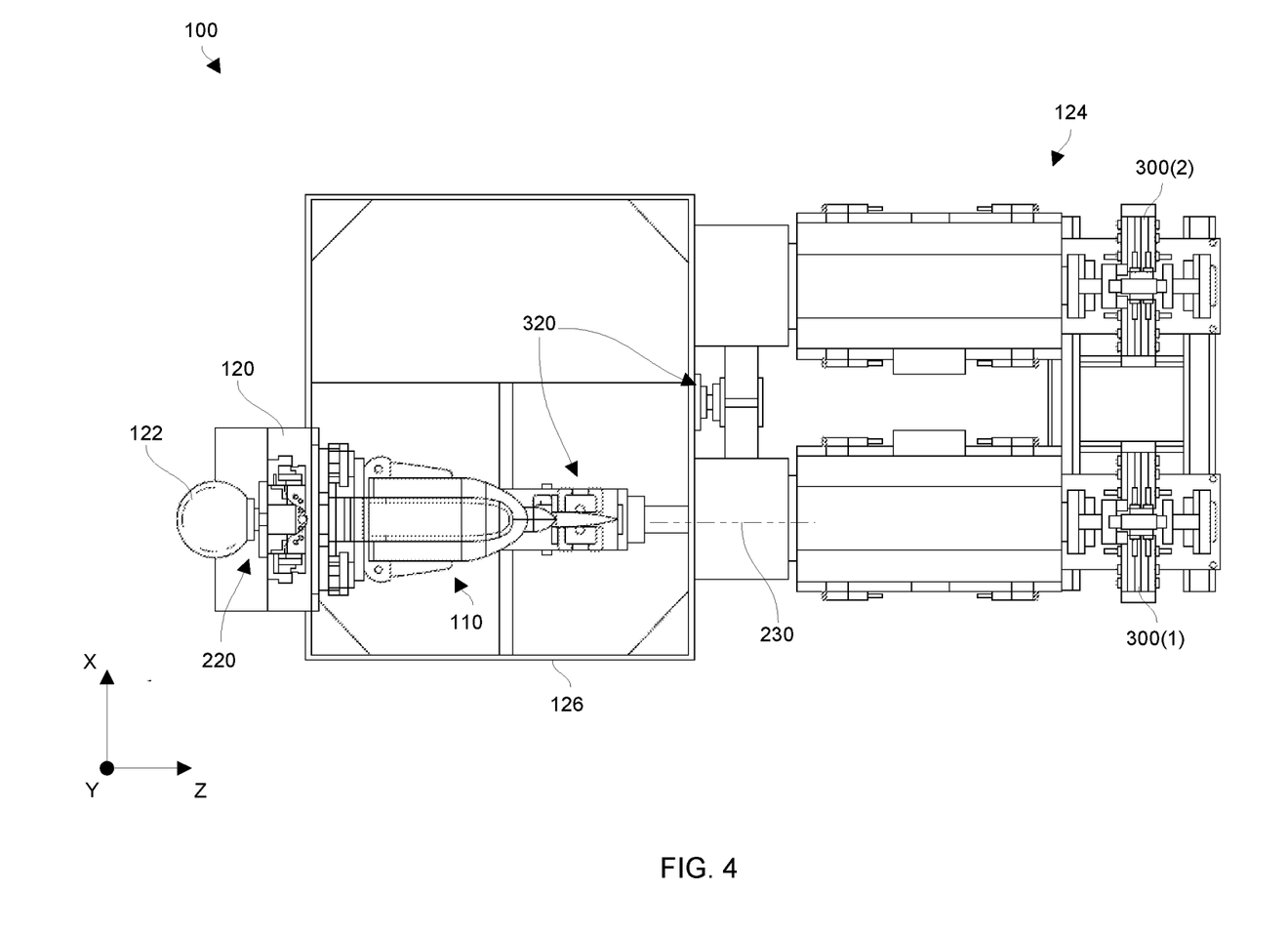
FIG. 4 is a top view of the break-in assembly in accordance with certain embodiments.

FIGS. 1 through 4 show various details of a break-in assembly (or break-in stand) 100 for breaking in gear boxes 110 in accordance with certain embodiments. FIG. 1 is a block diagram of the break-in assembly 100 in accordance with certain embodiments. FIG. 2 is a first perspective view of the break-in assembly 100 in accordance with certain embodiments. FIG. 3 is a second perspective view of the break-in assembly 100 (i.e., from a different angle) in accordance with certain embodiments. FIG. 4 is a top view of the break-in assembly 100 in accordance with certain embodiments.

As shown in FIGS. 1 through 4, the break-in assembly 100 includes a gear box support 120, a drive apparatus 122, a loading apparatus 124, a water tank 126, and control/resources 128. In accordance with certain embodiments, the break-in assembly 100 further includes other equipment which is not shown in detail (represented by block 130 in FIG. 1) such as gear box installation/de-installation equipment, specialized equipment for raising/lowering each gear box 110, adjustment/tuning equipment for making minor adjustments/etc. to each gear box 110 when processing the gear boxes 110, and so on.

The gear box support 120 is constructed and arranged to support a gear box 110 during break-in. In accordance with certain embodiments, the gear box support 120 is disposed in a fixed position relative to one or more other components of the break-in assembly 100 such as the drive apparatus 120, the loading apparatus 122, and the water tank 126. For example, the gear box support 120 may be disposed between (or disposed adjacent to) the drive apparatus 122 and the water tank 126 to enable the drive apparatus 122 to access the gear box 110 while at least a portion of the gear box 110 resides within the water tank 126.

The drive apparatus 122 is constructed and arranged to drive a gear box 110 while the gear box 110 is supported by the gear box support 120. In accordance with certain embodiments, the drive apparatus 122 includes a motor or engine (e.g., an electric motor) which is under control of the control/resources 128.

The loading apparatus 124 is constructed and arranged to apply loading to a gear box 110 while the drive apparatus 122 drives the gear box 110. In accordance with certain embodiments, the loading apparatus 124 includes a set of dynamometers which is under control of the control/resources 128. It should be understood that water brake dynamometers are suitable for use by the loading apparatus 124 although other types of dynamometers may also be employed (e.g., fan brake, hydraulic, motor-based, etc.).

The water tank 126 is constructed and arranged to hold water (or similar fluid) to enable a gear box 110 to receive water (or other fluid) cooling during break-in. To this end, the water tank 126 receives water from a water source and maintains a water level that enables a portion of the gear box 110 to remain submerged (immersed within the water) during break-in.

The control/resources 128 are constructed and arranged to operate the break-in assembly 100 when breaking in a gear box 110. Accordingly, the control/resources 128 represents valves, fluid connections, fluid sensors, etc. that are involved in providing and maintaining water within the water tank 126 during operation. Additionally, the control/resources 128 represents electronic circuitry for operating the drive apparatus 122 (e.g., an electric motor controller), the loading apparatus 124 (e.g., a set of dynamometer controllers), and so on. In accordance with certain embodiments, the control/resources 128 includes computerized circuitry including electronic storage that stores a set of break-in schedules 140 (e.g., entries identifying run times and motor speeds) that the control/resources 128 uses to operate the break-in assembly 100.

During operation, a gear box 110 to be broken in is installed on the break-in assembly 100. In particular, the gear box 110 is mounted to the gear box support 120, and connected to the drive apparatus 122 and the loading apparatus 124.

The water tank 126 is then filled with water so that at least a portion of the gear box 110 sits within the water in manner similar to that when the gear box 110 will eventually be installed on a water vessel. Accordingly, the gear box 110 has access to the water for cooling purposes.

Next, the control/resources 128 operates the break-in assembly 100 to break-in the gear box 110. Such operation may be guided by computerized equipment, input from one or more human operators, combinations thereof, and so on.

In accordance with certain embodiments, the control/resources 128 may run the drive apparatus 112 in accordance with a particular break-in schedule 140 prescribed for the particular model of gear box 110. Such a break-in schedule 140 may indicate a series of time ranges and associated different speeds for driving the gear box 110. For example, such a break-in schedule 140 may dictate gradually increasing and decreasing the rotational speed of the gear box 110 between lower and upper limits of a range over a predefined time interval, followed by running the gear box 110 at different constant speeds in subsequent time intervals, and so on over an extended time period such as 10 hours, 15 hours, 20 hours, etc. The break-in schedule 140 may even require resting and/or servicing the gear box for periods of time, or starting and stopping the gear box between such resting and/or servicing time periods, and so on.

It should be appreciated that running the gear box 110 as described above alleviates the need to then repeat a break-in process for the gear box 110 after the gear box 110 has been removed from the break-in assembly 100 and installed on a water vessel. Accordingly, utilization of the break-in assembly 100 alleviates unnecessary consumption of water vessel service time, crew time, vessel preparation and docking resources, and so on. Likewise, if a water vessel later requires a replacement stern drive, the water vessel does not need to be removed from service in order to break-in a replacement stern drive in place of an old stern drive since such the replacement stern drive may be broken in using the break-in assembly 100 prior to replacing the old stern drive.

Figure 5:
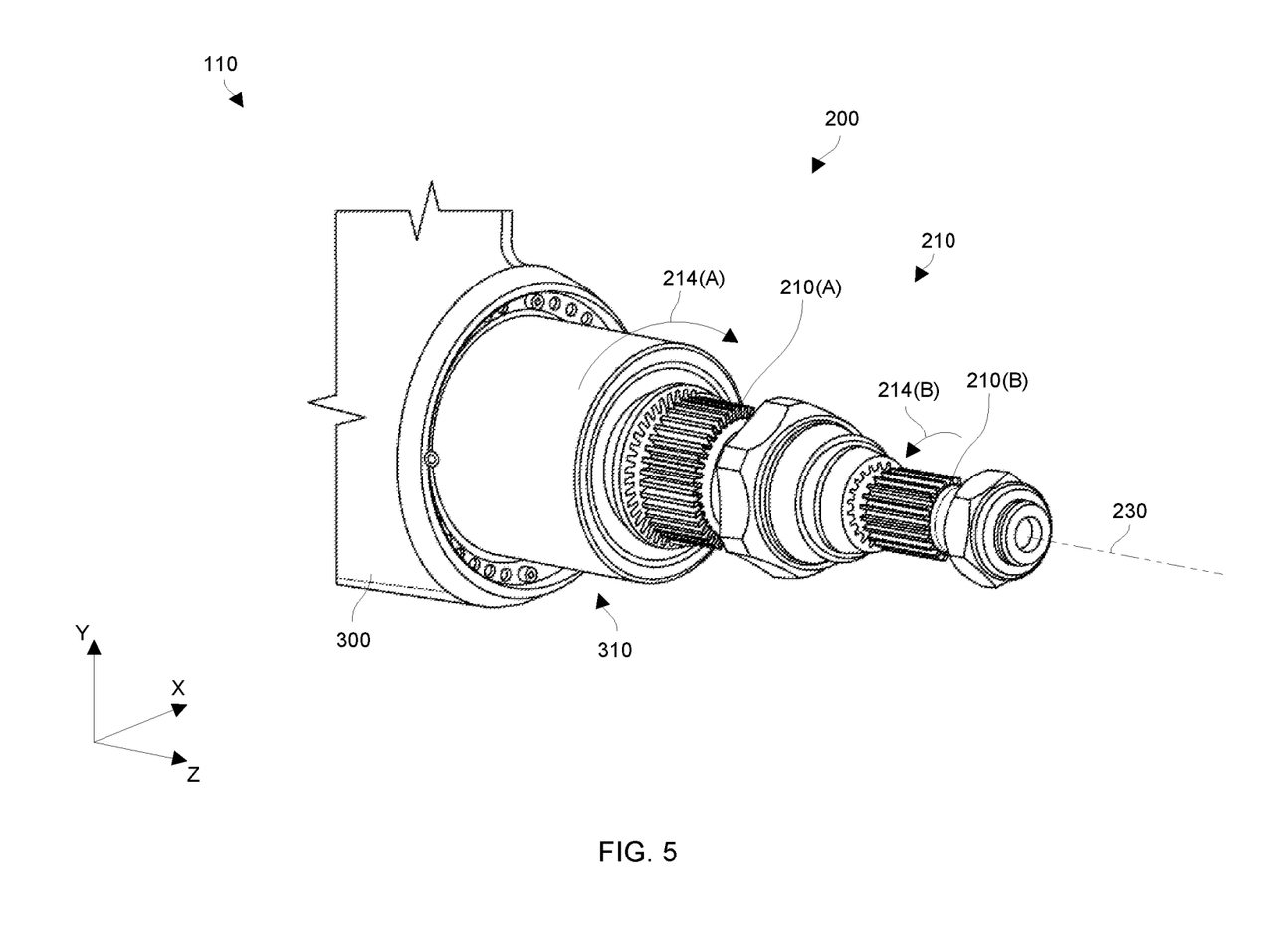
FIG. 5 is a perspective view of a portion of a stern drive gear box which is suitable for being broken in by the break-in assembly of FIG. 1 in accordance with certain embodiments.

FIG. 5 shows certain details of a portion 200 of a gear box 110 which is suitable for being broken in by the break-in assembly 100 (e.g., also see FIGS. 1 through 4). The loading apparatus 124 is configured to interface with the gear box portion 200.

By way of example, the gear box 110 forms at least a portion of a stern drive for a boat or similar water vessel. Nevertheless, it should be understood that various improvements disclosed herein make the break-in assembly 100 (or certain features, concepts, and/or aspects of the break-in assembly 100) well suited for breaking in other equipment/devices/etc. such as gear boxes for submarines, unmanned watercraft, and so on. Moreover, such a break-in assembly 100 may be used to break-in other types of equipment such as gears for turning fans, propellers, and/or other objects with similar characteristics/geometries/etc., mechanical linkages for operating control surfaces, other types of equipment drive by chains/belts/etc., as well as other mechanical devices and/or componentry.

As shown in FIG. 5, the portion 200 includes a set of propeller shafts 210 that rotate in response to rotational input. When the gear box 110 is installed on the break-in assembly 100, the rotational input to the gear box 110 is provided by the drive apparatus 122. When the gear box 110 is installed in the field (e.g., on a boat), the rotational input to the gear box 110 is provided by other means such as by a boat engine (e.g., in the context of a stern drive).

When the gear box 110 is installed on the break-in assembly 100, the drive apparatus 112 imparts rotational input to an input shaft 220 of the gear box 110 (also see FIGS. 3 and 4). Such rotation is conveyed from the input shaft 220 through mechanical linkage of the gear box 110 (e.g., gears/etc.) to the propeller shafts 210. It should be understood that an interfacing portion of the drive apparatus 112 that engages the input shaft 220 is illustrated in certain figures simply as a ball (e.g., to indicate that the interfacing portion may have a variety of different geometries based on how the gear box 110 receives input).

As further shown in FIG. 5, the axis of rotation 230 for the set of propeller shafts 210 extends along the Z-axis in FIG. 5 (also see FIGS. 2 through 4). By way of example, the set of propeller shafts 210 includes counter rotating shafts 210(A), 210(B). To this end, in response to rotational input from the drive apparatus 122 of the break-in assembly 100, the shaft 210(A) rotates in the clockwise direction 214(A) and the shaft 210(B) simultaneously rotates in the counterclockwise direction 214(B) (e.g., as viewed by looking in the negative Z-direction).

Although it is shown that shafts 210(A), 210(B) coaxially rotate, it should be understood that other types of gear boxes 110 are suitable for breaking in using the break-in assembly 100 such as gear boxes 110 that simply rotate a single shaft 210, gear boxes 110 that rotate multiple shafts 210 that are not coaxial, and so on.

With reference back to FIGS. 1 through 4, it should be understood that the drive apparatus 122 of the break-in assembly 100 includes an electric motor and a controller coupled with the electric motor in accordance with certain embodiments. The electric motor is constructed and arranged to operate the gear box in a manner similar to that of an engine in the field (e.g., by providing drive to the input shaft 220 or another portion of the gear box 110). Additionally, the controller is constructed and arranged to control motor speed and thus direct the electric motor to operate the gear box 110 at the varying speeds during a gear box break-in period.

It should be understood that the controller may be separate from the control/resources 128 (e.g., the controller may receive input from the control/resources 128, also see FIG. 1) or formed, at least in part, by a portion of the control/resources 128 (i.e., the drive apparatus 122 and the control/resources 128 may be integrated at least in part). In such situations, the controller may include memory, and control circuitry coupled with the memory. The memory stores one or more break-in schedules 140 (FIG. 1) which cause the control circuitry to direct the electric motor to vary rotational speed of an input shaft of the gear box 110 in accordance with a predefined engine curve during the gear box break-in period (e.g., with predefined speed peaks and troughs to control initial wear of the gear box 110).

Additionally, as shown in FIGS. 2 through 4, the loading apparatus 124 may include a set of dynamometers 300(1), 300(2) (collectively, dynamometers 300) constructed and arranged to apply loading to the gear box 110 while the drive apparatus 122 drives the gear box 110. In accordance with certain embodiments, one or more of the dynamometers 300 is a water brake dynamometer having a set of water feeds 310 for enhanced loading control (e.g., see FIGS. 2 and 3).

Each dynamometer 300 engages a respective propeller shaft 210 of the gear box 110 (FIG. 5) to provide loading while the propeller shaft 210 rotates in response to operation of the drive apparatus 122. Along these lines, each dynamometer 300 (or extension hardware of the loading apparatus 124) may extend in an elongated manner into the water tank 126 to mechanically engage a respective propeller shaft 210 (e.g., see FIGS. 2 through 4). To enable multiple dynamometers 300 to remain parallel to each other (e.g., side-by-side) and thus operate uniformly (e.g., for easier/uniform user access, to control/manage vibration, etc.), the loading apparatus 124 may further include additional linkage/hardware 320 that may reside inside and/or outside the water tank 126.

In accordance with certain embodiments, the dynamometer 300(1) is a first water brake dynamometer device that couples with the first propeller shaft 210(A) of the gear box 110 to provide a first load to the first propeller shaft 210(A). Similarly, the dynamometer 300(2) is a second water brake dynamometer device that couples with the second propeller shaft 210(B) of the gear box 110 to provide a second load to the second propeller shaft 210(B). When the linkage within the gear box 110 spins the first propeller shaft 210(A) and the second propeller shaft 210(B) in opposite directions, the loading apparatus 124 properly applies loading to all of the propeller shafts 210. It should be understood that each water brake dynamometer 300 may be independently controlled (e.g., via respective water feeds 310) thus enabling the loading apparatus 124 to apply the same amount of loading to each propeller shaft 210 and/or different loads to different propeller shafts 210 (e.g., to better simulate normal operating loads). Such a feature provides the break-in assembly 100 with flexibility and adaptability to support break-in processes for different gear box designs/configurations.

Furthermore, it should be understood that the water tank 126 is disposed adjacent the gear box support 120, and configured to contain water (or other fluid) within which the portion 200 of the gear box 110 operates. Along these lines, the water tank 126 is provisioned with a set of ports 330 to enable filling from a fluid source and emptying to a fluid drain. During operation, the water within the water tank 126 provides cooling to the gear box 110 while the drive apparatus 122 drives the gear box 110.

Figure 6:
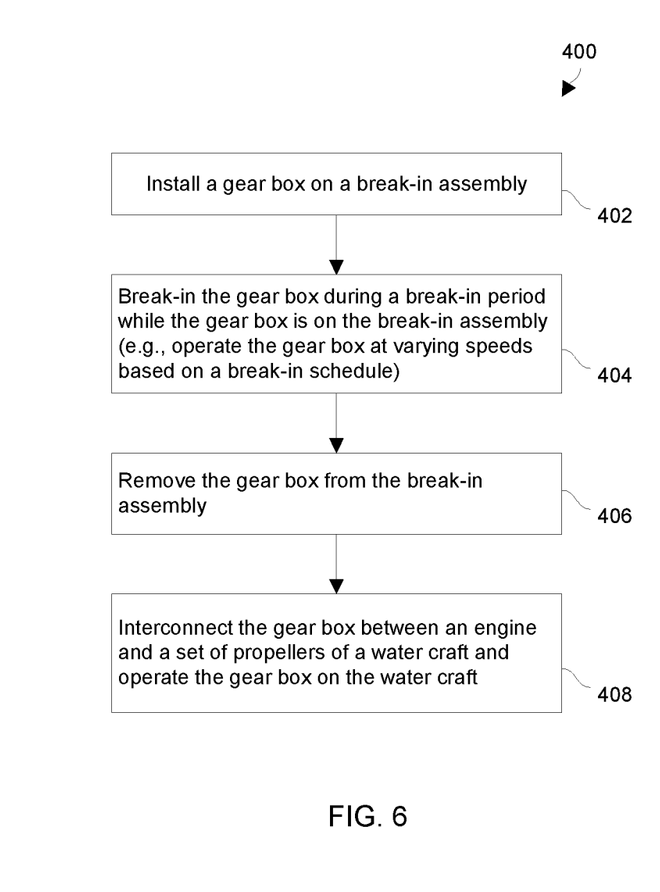
FIG. 6 is a flowchart of a procedure which is performed in accordance with certain embodiments.

FIG. 6 is a flowchart of a procedure 400 to operate a gear box. Such a procedure 400 may be performed shortly after manufacturing the gear box and thus enabling reduction or elimination of unevenness and/or roughness/imperfection among various gear box components (e.g., to eliminate gear box "hot spots").

At 402, the gear box is installed on a break-in assembly (e.g., also see FIGS. 1 through 4). Such a break-in assembly is not the final location for the gear box, but is instead provided for the purpose of breaking in the gear box prior to deployment in the field. As mentioned earlier, such installation may involve connecting an input shaft of the gear box to a drive apparatus of the break-in assembly (e.g., an electric motor and controller to provide speed control), and a set of propeller shafts (or other rotating shafts) to a loading apparatus of the break-in assembly (e.g., a set of dynamometers). In some arrangements, a portion of the gear box sits within a water tank and the water tank is filled with water that provides cooling during gear box operation.

At 404, the gear box is broken in during a gear box break-in period while the gear box is installed on the break-in assembly. Along these lines, the break-in assembly may operate the gear box a varying speeds for a prescribed amount of time (e.g., 10 hours, 20 hours, etc.). In some arrangements, the gear box is driven in accordance with a predefined engine curve (e.g., varying speeds based on a sequence of speed/time entries as predefined by a break-in schedule) during the gear box break-in period.

At 406, after the gear box break-in period, the gear box is removed from the break-in assembly. In particular, the gear box is disconnected from the various components of the break-in assembly and is now ready for regular use in the field. At this point, the gear box components are able to operate smoothly and wear evenly during regular use. Once the gear box is removed from the break-in assembly, another gear box may be installed on the break-in assembly for similar processing.

At 408, after the gear box is removed from the break-in assembly, the gear box is installed in the field. For example, in the context of a water craft, the gear box may be interconnected between an engine and a set of propellers of the water craft. The gear box is thus available to provide drive from the engine to the set of propellers to provide propulsion to the water craft.

Figure 7:
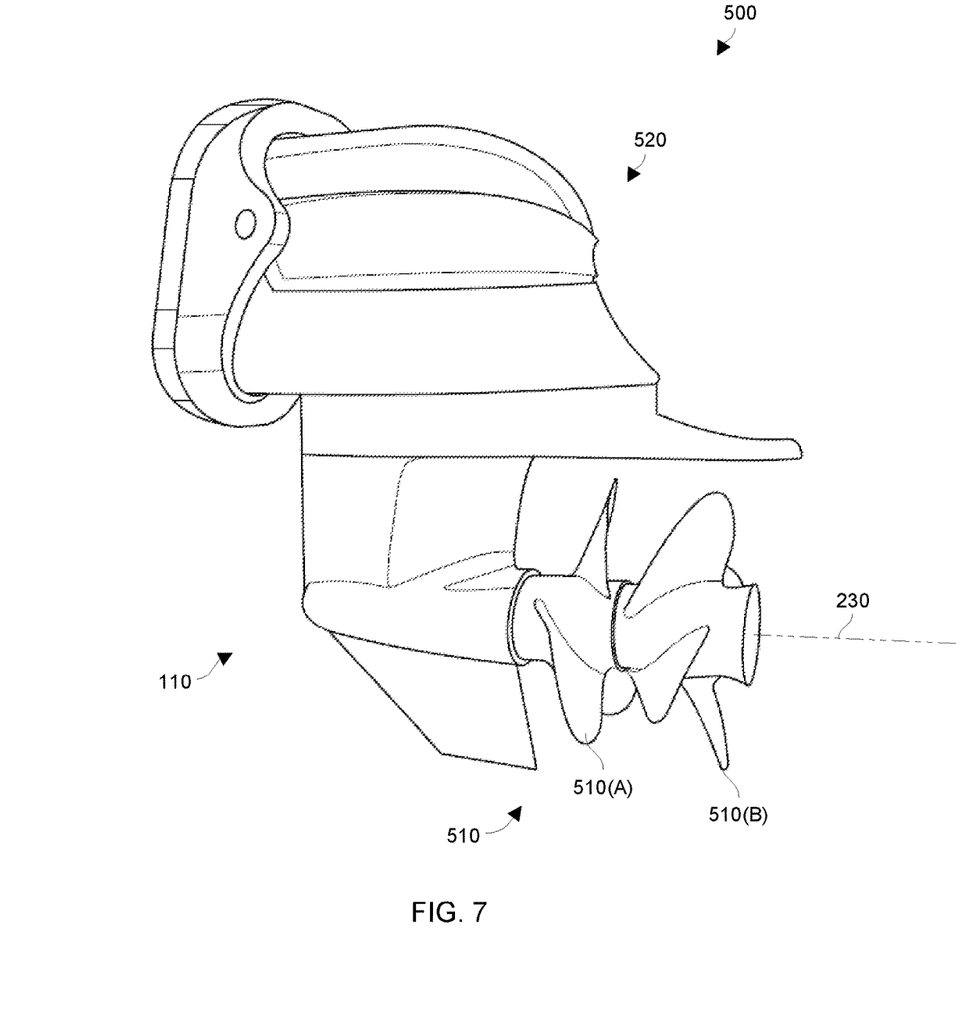
FIG. 7 is a perspective view of a stern drive provisioned with propellers in the context of being deployed on a water vessel following breaking in of a gear box of the stern drive in accordance with certain embodiments.

FIG. 7 shows an example stern drive 500 within which a gear box 110 operating in accordance with the procedure 400 (FIG. 6) may be used. By way of example only, the stern drive 500 is configured to operate a set of propellers 510 (e.g., dual propellers 510(A), 510(B)). It should be understood that the stern drive 500 may include other components 520 such as an engine, sensors, and so on.

During operation such as when the gear box 110 is installed with the stern drive 500 and the stern drive 500 is deployed in the field (e.g., on a water vessel), the stern drive 500 operates by driving the gear box 110 to turn the set of propellers 510 about an axis 230 (e.g., to propel the water vessel). For example, in the context of counter rotating propellers 510, one propeller 510(A) rotates in a first direction while the other propeller 510(B) rotates in a second direction that is opposite the first direction.

As described above, improved techniques are directed to utilizing a break-in assembly 100 to break-in a gear box 110 (e.g., stern drive linkage) prior to deployment of the gear box 110 in the field. Along these lines, such a gear box 110 may eventually form part of a stern drive 500 of a water vessel. However, rather than perform break-in of the gear box 110 while the gear box 110 is on the water vessel, the gear box 110 may be installed on the break-in assembly 100 where a drive apparatus 122 drives the gear box 110 and a loading apparatus 124 simultaneously applies load to the gear box 110 in order to operate (or exercise) the gear box 110 in accordance with a predefined break-in schedule 140. Such a break-in assembly 100 may include a water tank 126 within which at least a portion of the gear box 110 operates in order to receive water cooling from water within the water tank 126. Such processing via the break-in assembly 100 enables the gear box 110 to be broken in prior to installation on a water vessel thus minimizing consumption of other water vessel resources (e.g., water vessel service time, crew time, etc.).

It should be appreciated that, conventionally, stern drives are broken in while in the field (e.g., on the boat that the stern drive is supposed to ultimately serve) in accordance with a break-in schedule. However, this conventional break-in approach wastes resources such as water vessel service time, crew time, vessel preparation and docking resources, and so on. Moreover, if such a water vessel subsequently requires a replacement stern drive, the water vessel must be removed from normal service while the replacement stern drive is broken in via the above-described conventional break-in approach.

However, in accordance with certain embodiments, a stern drive break-in stand (or assembly) is used to complete the break-in period required for newly manufactured stern drive gear boxes. Such a test stand can spin the gear box at varying speeds while simultaneously loading counter rotating props to simulate normal operating conditions and achieve all break-in requirements. Such a break-in stand has the capability to load a single rotating prop as well as multiple props (e.g., dual props).

In some arrangements, the stern drive break-in stand has a water tank that the stern drive mounts into. This allows water to be used to cool the stern drive during the break-in period. The stern drive is turned with an electric motor at varying speeds as called out in a break-in schedule. The counter rotating props shafts are each coupled to their own water brake dynamometer to load the props independently. Such a load may be applied based on the engine curve relative to the rotational speed as called out in the break-in schedule.

While various embodiments of the present disclosure have been particularly shown and described, it will be understood by those skilled in the art that various changes in form and details may be made therein without departing from the spirit and scope of the present disclosure as defined by the appended claims.

For example, in accordance with certain embodiments, the above-described break-in assembly (or break-in stand) may break-in multiple gear boxes simultaneously. In such a situation, the gear boxes may be mounted on one side of a common water tank. Drive apparatus 122 then provides drive to the gear boxes (e.g., on one side of the water tank) while sets of dynamometers apply loading (e.g., on the other side of the water tank).

Moreover, certain parts of the break-in assembly may be shared (or used to interact with multiple gear boxes simultaneously) such as the drive apparatus 122, the control/resources 128, and so on. Such modifications and enhancements are intended to belong to various embodiments of the disclosure.

What is claimed is:

1. Break-in assembly to break-in a gear box, the break-in assembly comprising:
   a gear box support constructed and arranged to support the gear box;
   a drive apparatus coupled with the gear box support, the drive apparatus being constructed and arranged to drive the gear box while the gear box is supported by the gear box support;
   a loading apparatus disposed in a fixed position relative to the gear box support, the loading apparatus being constructed and arranged to apply loading to the gear box while the drive apparatus drives the gear box; and
   a water tank adjacent the gear box support, the water tank being constructed and arranged to contain water that provides cooling to the gear box while the drive apparatus drives the gear box.

2. Break-in assembly as in claim 1 wherein the drive apparatus includes:
   an electric motor constructed and arranged to operate the gear box; and
   a controller coupled with the electric motor, the controller being constructed and arranged to direct the electric motor to operate the gear box at varying speeds during a gear box break-in period.

3. Break-in assembly as in claim 2 wherein the controller includes:
   memory; and
   control circuitry coupled with the memory, the memory storing a break-in schedule which causes the control circuitry to direct the electric motor to vary rotational speed of an input shaft of the gear box in accordance with a predefined engine curve during the gear box break-in period.

4. Break-in assembly as in claim 3 wherein the break-in schedule is constructed and arranged to cause the control circuitry to direct the electric motor to vary the rotational speed of the input shaft for a break-in time period of at least 10 hours.

5. Break-in assembly as in claim 4 wherein the break-in schedule is constructed and arranged to cause the control circuitry to impose rest periods of time within the break-in time period, the control circuitry stopping the gear box during the rest periods of time.

6. Break-in assembly as in claim 1 wherein the loading apparatus includes:
   a set of dynamometers constructed and arranged to apply the loading to the gear box while the drive apparatus drives the gear box.

7. Break-in assembly as in claim 6 wherein the gear box includes
   a propeller shaft configured to spin a propeller; and
   wherein the set of dynamometers includes:
   a water brake dynamometer constructed and arranged to couple with the propeller shaft of the gear box to provide load to the propeller shaft.

8. Break-in assembly as in claim 6 wherein the gear box includes
   a first propeller shaft, a second propeller shaft, and linkage configured to simultaneously spin the first propeller shaft and the second propeller shaft in opposite directions; and
   wherein the set of dynamometers includes:
   a first water brake dynamometer constructed and arranged to couple with the first propeller shaft of the gear box to provide a first load to the first propeller shaft when the linkage simultaneously spins the first propeller shaft and the second propeller shaft in the opposite directions, and a second water brake dynamometer constructed and arranged to couple with the second propeller shaft of the gear box to provide a second load to the second propeller shaft when the linkage simultaneously spins the first propeller shaft and the second propeller shaft in the opposite directions.

9. Break-in assembly as in claim 8 wherein the loading apparatus further includes:

a dynamometer base constructed and arranged to hold the first water brake dynamometer and the second water brake dynamometer in a side-by-side parallel arrangement while the first water brake dynamometer couples with the first propeller shaft and the second water brake dynamometer couples with the second propeller shaft.

10. Break-in assembly as in claim 1 wherein the gear box support is constructed and arranged to position at least a portion of the gear box within the water tank to enable water contained within the water tank to provide cooling to the gear box while the drive apparatus drives the gear box.

11. Break-in assembly as in claim 10 wherein the loading apparatus is constructed and arranged to mechanically engage with the portion of the gear box positioned within the water tank.

12. A method of operating a gear box, the method comprising:

installing the gear box on a break-in assembly;

breaking in the gear box during a gear box break-in period while the gear box is installed on the break-in assembly; and after the gear box break-in period, removing the gear box from the break-in assembly;

wherein installing the gear box on the break-in assembly includes:

connecting a portion of the gear box to a loading apparatus, and filling a water tank with water to submerge the portion of the gear box connected to the loading apparatus within the water.

13. A method as in claim 12 wherein the break-in assembly includes:

a gear box support constructed and arranged to support the gear box, and a drive apparatus coupled with the gear box support, the drive apparatus being constructed and arranged to drive the gear box while the gear box is supported by the gear box support;

wherein the loading apparatus is disposed in a fixed position relative to the gear box support, the loading apparatus being constructed and arranged to apply loading to the gear box while the drive apparatus drives the gear box; and wherein breaking in the gear box during the gear box break-in period includes:

simultaneously driving the gear box using the drive apparatus and applying loading to the gear box from the loading apparatus.

14. A method as in claim 13 wherein the water tank is adjacent the gear box support, the water tank being constructed and arranged to contain water that provides cooling to the gear box while the drive apparatus drives the gear box.

15. A method as in claim 14 wherein the loading apparatus includes a water brake dynamometer; and wherein connecting the portion of the gear box to the loading apparatus includes:

coupling the water brake dynamometer to the portion of the gear box.

16. A method as in claim 15 wherein simultaneously driving the gear box using the drive apparatus and applying the loading to the gear box from the loading apparatus includes:

operating the gear box at varying speeds during the gear box break-in period.

17. A method as in claim 16 wherein operating the gear box at the varying speeds during the gear box break-in period includes:

directing an electric motor to vary rotational speed of the gear box in accordance with a predefined engine curve during the gear box break-in period.

18. A method as in claim 17, further comprising:

after the gear box is removed from the break-in assembly, interconnecting the gear box between an engine and a set of propellers of a water craft; and providing drive from the engine to the set of propellers through the gear box to provide propulsion to the water craft.

19. A method as in claim 12 wherein breaking in the gear box during the gear box break-in period includes:

varying a rotational speed of an input shaft that drives the gear box for a break-in time period of at least 10 hours.

20. A method as in claim 19 wherein breaking in the gear box during the gear box break-in period further includes:

imposing rest periods of time within the break-in time period, the input shaft stopping the gear box during the rest periods of time.

* * * * *